United States Patent [19]
Maki et al.

[11] Patent Number: 5,612,739
[45] Date of Patent: Mar. 18, 1997

[54] CHARGE TRANSFER DEVICE

[75] Inventors: Yasuhito Maki; Maki Sato; Tadakuni Narabu, all of Kanagawa, Japan

[73] Assignee: Sony Corporation, Tokyo, Japan

[21] Appl. No.: 610,577

[22] Filed: Mar. 7, 1996

Related U.S. Application Data

[63] Continuation of Ser. No. 216,542, Mar. 23, 1994, abandoned.

[30] Foreign Application Priority Data

Mar. 23, 1993 [JP] Japan .................................. 5-088051

[51] Int. Cl.$^6$ .................................................. H04N 5/335
[52] U.S. Cl. ........................ 348/311; 348/243; 348/251; 358/461
[58] Field of Search ................................... 348/311, 243, 348/251, 254, 229, 306, 230, 249, 250, 294; 358/461; H04N 5/335, 3/14

[56] References Cited

U.S. PATENT DOCUMENTS

| | | | |
|---|---|---|---|
| 3,979,582 | 9/1976 | Mims | 364/807 |
| 4,375,059 | 2/1983 | Schlig | 341/162 |
| 4,412,343 | 10/1983 | Kosnocky | 377/58 |
| 4,602,291 | 7/1986 | Temes | 358/221 |
| 4,675,549 | 6/1987 | Steffe et al. | 348/311 |
| 4,839,729 | 6/1989 | Ando et al. | 358/213.16 |
| 4,914,519 | 4/1990 | Hashimoto et al. | 358/213.18 |
| 5,278,658 | 1/1994 | Takase | 358/213.15 |

FOREIGN PATENT DOCUMENTS

| | | | |
|---|---|---|---|
| 0016629 | 10/1980 | European Pat. Off. | H04N 3/15 |
| 0439912 | 8/1991 | European Pat. Off. | G01D 18/00 |
| 55-163952 | 12/1980 | Japan | H04N 5/30 |
| 59-050560 | 3/1984 | Japan | H01L 29/76 |
| 2078382 | 3/1990 | Japan | H04N 5/335 |

*Primary Examiner*—John K. Peng
*Assistant Examiner*—Andrew B. Christensen
*Attorney, Agent, or Firm*—Hill, Steadman & Simpson

[57] ABSTRACT

A charge transfer device including a charge input portion for inputting a reference charge, a charge transfer portion for receiving and transferring the reference charge, and a conversion portion converting the reference charge outputted from the charge transfer portion into a reference voltage. The reference charge input portion may be arranged to generate a reference charge. Alternatively, the reference charge may be externally generated. The charge transfer device may further include a signal charge input portion for inputting signal charges to the charge transfer portion. The signal charge input portion may be arranged to generate signal charges corresponding to incident light. Signal charges externally generated may be inputted to the signal charge input portion. The charge transfer device enables a charge-output voltage characteristic to be accurately detected at all times without any problem. It is also possible to accurately control the charge-output voltage characteristic.

12 Claims, 11 Drawing Sheets

☒ : Diffused region  ～ : Measuring well (IG2)

$V_{IS}$, $V_S$ : certain DC voltage

Solid line : t1
Broken line : t2

CHARGE TRANSFER DEVICE

This is a continuation of application Ser. No. 08/216,542, filed Mar. 23, 1994 now abandoned.

BACKGROUND OF THE INVENTION

1. Field of the Invention

The present invention relates to charge transfer devices and, more particularly, to a charge transfer device designed to transfer and convert signal charges into corresponding output voltages, for example, a linear sensor, an area sensor, or a delay element.

2. Description of the Related Art

FIGS. 1A and 1B show a conventional CCD-type solid-state image sensing device, in which 1A is a plan view, and 1B shows the waveform of an output voltage $V_{out}$.

Referring to the figures, a plurality of photoelectric conversion elements (hereinafter referred to as "photo-sensors") 1 form pixels which are arranged in a matrix form. Vertical registers 2 are formed to respectively correspond to vertical lines (columns) of photosensors 1. A horizontal register 3 horizontally transfers signal charges transferred by the vertical registers 2. An output buffer 4 converts each signal charge outputted from the horizontal register 3 into a voltage $V_{out}$.

In the conventional solid-state image sensing device or other charge transfer device, the relationship between the intensity of light incident on a photosensor 1 or the amount of signal charge generated by the incident light and the corresponding output voltage of the output buffer 4, that is, light intensity (amount of charge)-output voltage characteristic, depends largely on the supply voltage and temperature.

FIGS. 2A and 2B show the charge-output voltage characteristic in a standard state 2A and also in a state where a condition (temperature) has changed 2B. The output voltage has a tendency to rise as the temperature becomes higher. The tendency is particularly noticeable when the light intensity is low. However, even when the temperature is low, the output voltage is relatively high in a region where the light intensity is high. Thus, the slope of the characteristic curve delicately changes with temperature. Further, a change in the supply voltage causes the charge-output voltage characteristic to change, as a matter of course.

The fact that the charge-output voltage characteristic depends largely on the supply voltage and temperature means that for the same light intensity (amount of charge), the output voltage varies to a considerable extent in accordance with a change in the supply voltage or temperature. Accordingly, correction must be made when the characteristic has changed. Such correction can readily be made by the existing technique, provided that a quantity to be corrected can be judged.

Incidentally, there has heretofore been no method of appropriately detecting a quantity of change in the charge-output voltage characteristic. The conventional practice is to make a comparison between a subject signal charge serving as a reference white level and a reference black level (i.e., the reference black level of the output signal, optical black, or a subject signal serving as a reference black level). The conventional method suffers, however, from the problem that no characteristic can be detected unless a subject signal charge serving as a reference white level is inputted either at all times or every time a state change occurs. Further, it is difficult in practice to take light from the subject serving as a reference white level in one field. The reason for this is that the brightness of the subject cannot conveniently reach the reference white level when imaging process is actually initiated.

SUMMARY OF THE INVENTION

In view of the above-described problems of the related art, it is an object of the present invention to provide a charge transfer device which enables a charge-output voltage characteristic to be accurately detected at all times without any problem.

It is another object of the present invention to provide a charge transfer device which enables the charge-output voltage characteristic to be accurately controlled.

The present invention provides a charge transfer device including a charge input portion for inputting a reference charge, a charge transfer portion for receiving and transferring the reference charge, and a conversion portion converting the reference charge outputted from the charge transfer portion into a reference voltage. The reference charge input portion may be arranged to generate a reference charge. Alternatively, a reference charge externally generated may be inputted to the reference charge input portion. The charge transfer device may further include a signal charge input portion for inputting signal charges to the charge transfer portion. The signal charge input portion may be arranged to generate signal charges corresponding to incident light. Alternatively, signal charges externally generated may be inputted to the signal charge input portion.

According to another aspect of the present invention, a relationship between the amount of signal charge transferred by the charge transfer portion and the corresponding voltage outputted from the voltage conversion portion is detected on the basis of the reference voltage.

According to still another aspect of the present invention, there is provided a charge transfer device including a plurality of photoelectric conversion elements, a charge transfer portion for transferring signal charges generated in the photoelectric conversion elements, a reference charge input portion for inputting a reference charge to the charge transfer portion, and a conversion portion for converting each charge outputted from the charge transfer portion into a voltage.

According to a further aspect of the present invention, there is provided a charge transfer device including a plurality of photoelectric conversion elements arranged in a matrix form, a vertical charge transfer portion for vertically transferring signal charges generated in the photoelectric conversion elements, a reference charge input portion for inputting a reference charge to the vertical charge transfer portion, a horizontal charge transfer portion for horizontally transferring the reference charge and signal charges outputted from the vertical charge transfer portion, and a conversion portion for converting each charge outputted from the horizontal charge transfer portion into a voltage.

In the above-described charge transfer devices, if a part of the photoelectric conversion elements are shielded from light, it is possible to prevent a signal charge generated in a photoelectric conversion element from mixing with the reference charge transferred through the charge transfer portion, which would otherwise cause a variation in the amount of reference charge. Accordingly, it is possible to prevent a signal charge generated in a photoelectric conversion element from interfering with detection of a charge-output voltage characteristic and hence possible to detect it accurately. If the reference charge is outputted when no signal charge is outputted during each scanning period, the processing of the reference charge will not hinder the processing of the signal charges.

Further, if the charge input portion is composed of a plurality of charge input portions for outputting reference charges, respectively, which are different from each other, it becomes possible to obtain output voltages from the voltage conversion portion with respect to amounts of charge which are different from each other. In other words, it is possible to detect a charge-output voltage characteristic at a plurality of points. Thus, it becomes possible to detect a slope of a charge-output voltage characteristic curve and also a dark component. Accordingly, it is possible to grasp the charge-output voltage characteristic even more accurately and hence possible to make even more accurate correction of the voltage outputted from the voltage conversion portion.

The charge transfer device of the present invention may be arranged such that the reference charge input portions have respective measuring well portions for each determining an amount of reference charge, which are formed so that the measuring well portions have a specific area ratio. With this arrangement, the amounts of charge inputted to form a plurality of reference charges can be made different from each other according to the respective areas of the measuring well portions, and the ratio between the amounts of reference charge at a plurality of points can be determined by the area ratio. If the arrangement is such that the reference charge input portions each have one or more measuring well portions each having a predetermined area for determining an amount of reference charge so that the respective numbers of measuring well portions of the reference charge input portions have a specific integral ratio, the areas of the measuring well portions can be made uniform, and the ratio between the amounts of charge inputted to form a plurality of reference charges can be determined by the ratio between the numbers of measuring well portions. Accordingly, the ratio between the amounts of reference charge inputted can be accurately made an integral ratio.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIGS. 1A and 1B show a conventional charge transfer devices, in which FIG. 1A is a plan view of the device, and 1B is a chart showing the waveform of a voltage outputted therefrom;

DESCRIPTION OF THE PREFERRED EMBODIMENTS

Embodiments of the charge transfer device according to the present invention will be described below in detail with reference to the accompanying drawings.

FIGS. 3A to 3D show a first embodiment of the charge transfer device according to the present invention in which the charge transfer device is applied to a solid-state image sensing device. In FIGS. 3A to 3D, 3A is a plan view of the embodiment, 3B is a chart showing the waveform of an output voltage from a voltage conversion portion (buffer), 3C is an enlarged plan view of a reference charge input portion, and 3D shows the potential profile in the reference charge input portion and also the waveforms of transfer pulses.

The first embodiment includes photosensors 1, vertical registers 2, a horizontal register 3, and an output buffer 4 that converts each signal charge outputted from the horizontal register 3 into a voltage $V_{out}$.

Figure 1A:
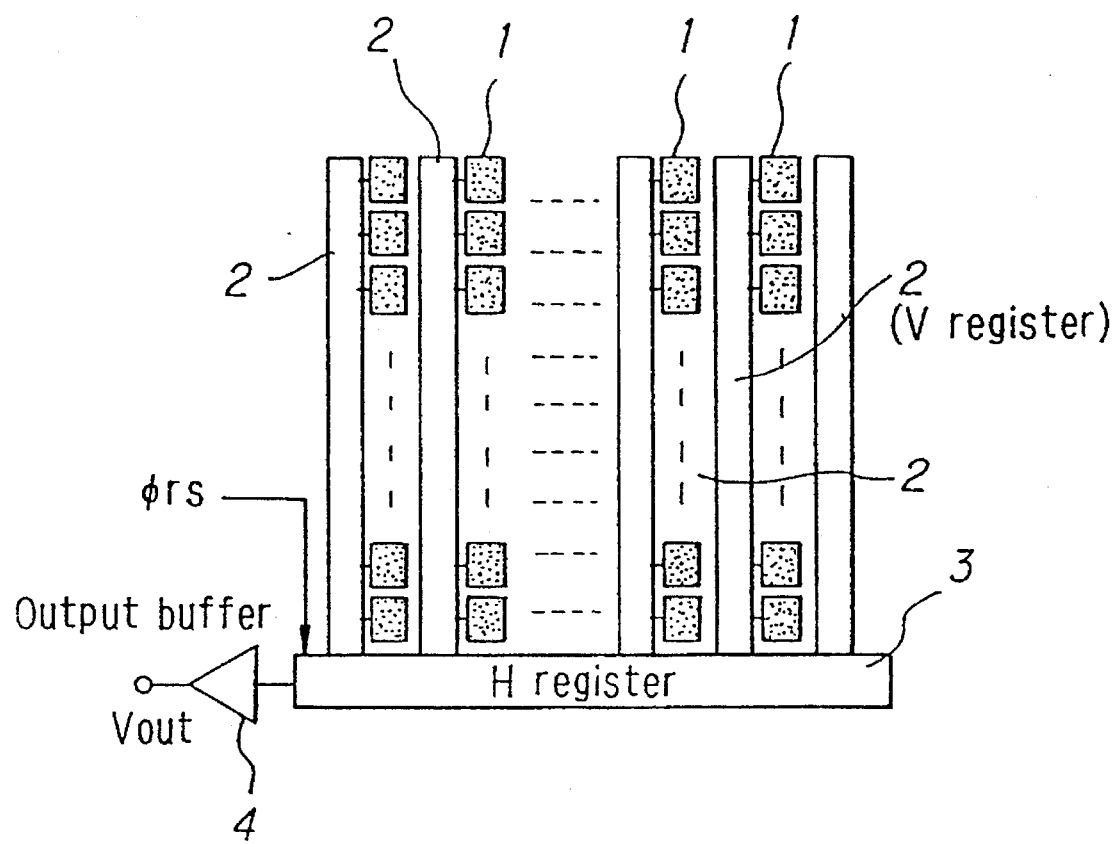
Figure 1B:
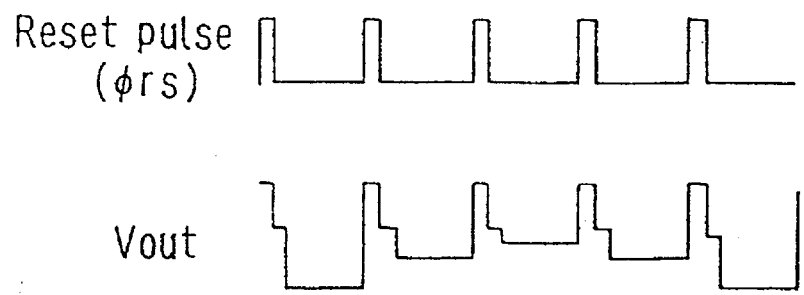
Figure 2A:
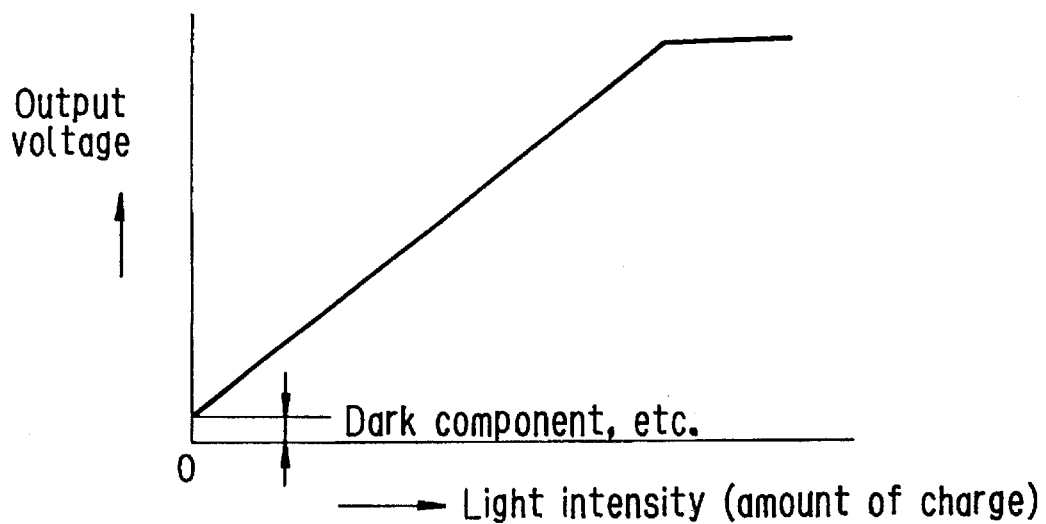
FIGS. 2A and 2B graphically show a charge-output voltage characteristic in a standard state 2A and also in a state where a condition has changed 2B, for explanation of a problem to be solved by the present invention.
Figure 2B:
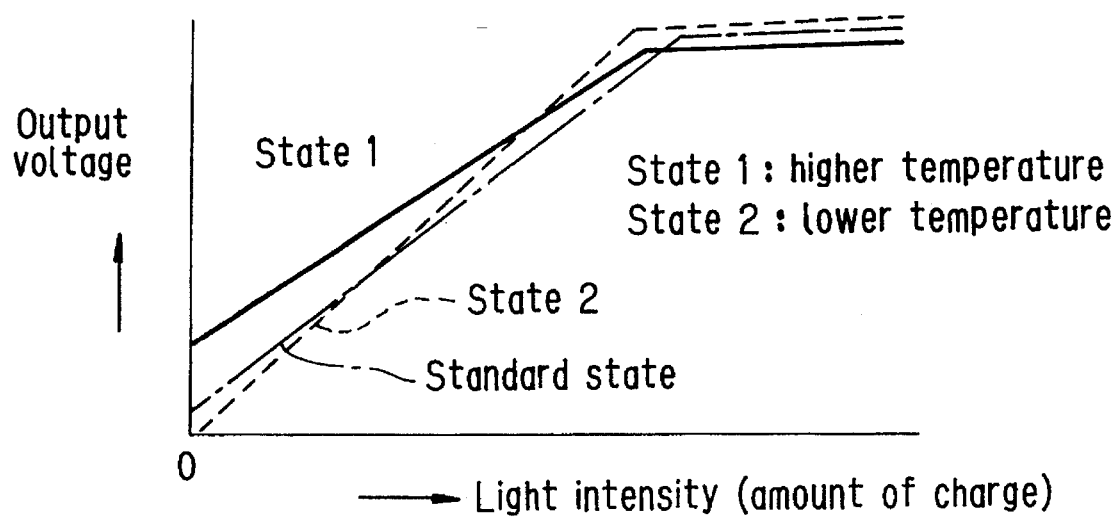

The charge transfer device in this embodiment differs from the conventional charge transfer device, shown in FIGS. 1A and 1B, in that it has vertical registers 2a and 2b for detecting a charge-output voltage characteristic in addition to the vertical registers 2 for vertically transferring signal charges generated by photoelectric conversion in the photosensors 1, and the vertical registers 2a and 2b are respectively supplied with reference charges Q1 and Q2 from reference charge input portions 5a and 5b by the diode cut-off method, for example. The amounts of charge inputted to form the reference charges Q1 and Q2 which are to be vertically transferred by the vertical registers 2a and 2b are determined by the respective areas of measuring well portions 7a and 7b each having a predetermined bias voltage $V_s$ applied to a gate electrode thereof. The wider the area of the measuring well portion, the larger the amount of reference charge; the ratio between the amounts of charge Q1 and Q2 is approximately equal to the ratio between the areas of the measuring well portions 7a and 7b.

Photosensors 1a and 1b from which signal charges are read out to the vertical registers 2a and 2b are shielded from light.

In the charge transfer device of this embodiment, for each horizontal period, the reference charge Q1 inputted from the reference charge input portion 5a is first read out by the horizontal register 3 and converted into an output voltage V1 by the buffer 4, and then the reference charge Q2 is read out and converted into an output voltage V2 by the buffer 4. Thereafter, signal charges, which are obtained by photoelectric conversion of incident light from the subject in the photosensors 1 (horizontal lines, i.e., rows), are sequentially read out and converted into corresponding voltages by the buffer 4. Reading of the reference charges Q1 and Q2 is executed during the blanking period (horizontal blanking period) in each horizontal period.

Figure 3A:
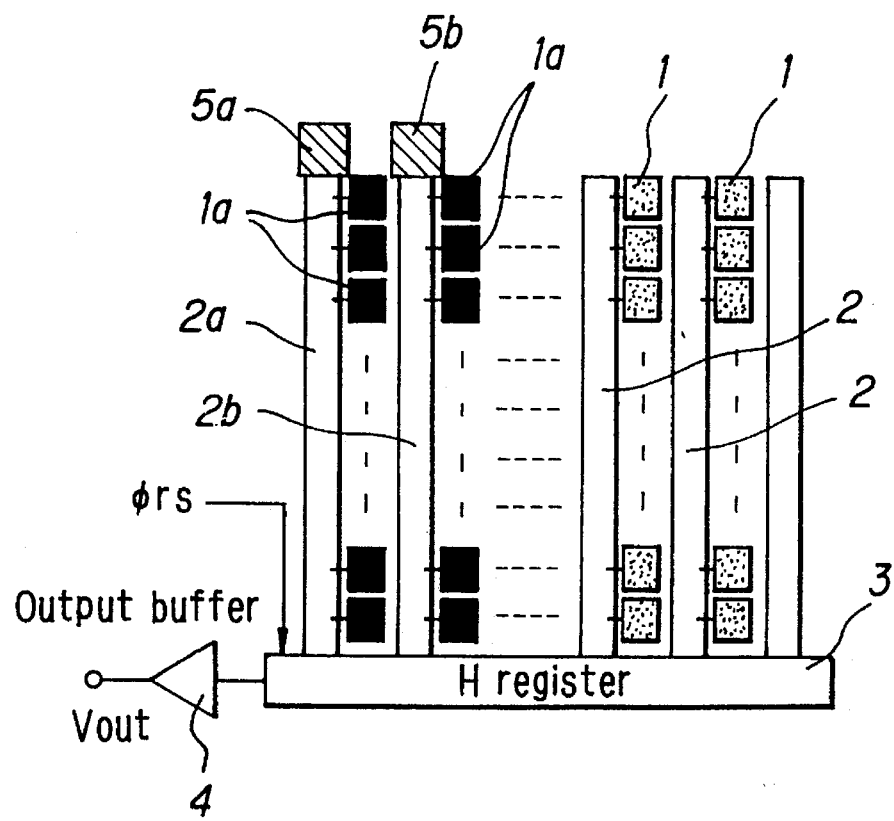
FIGS. 3A to 3D show a first embodiment of the charge transfer device according to the present invention, in which 3A is a plan view of the embodiment, 3B is a chart showing the waveform of an output voltage from a voltage conversion portion, 3C is an enlarged plan view of a reference charge input portion, and 3D shows the potential profile in the reference charge input portion and also the waveforms of transfer pulses.
Figure 3B:
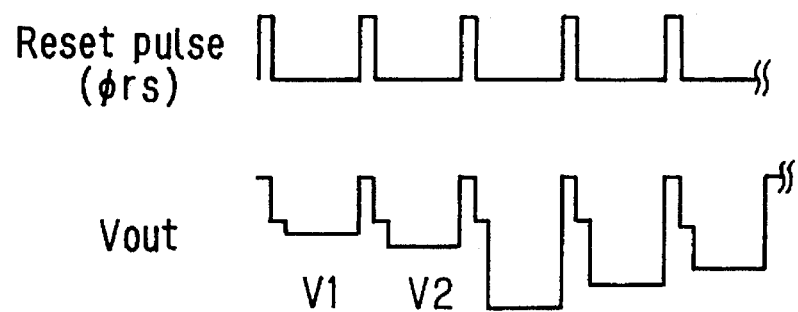
Figure 3C:
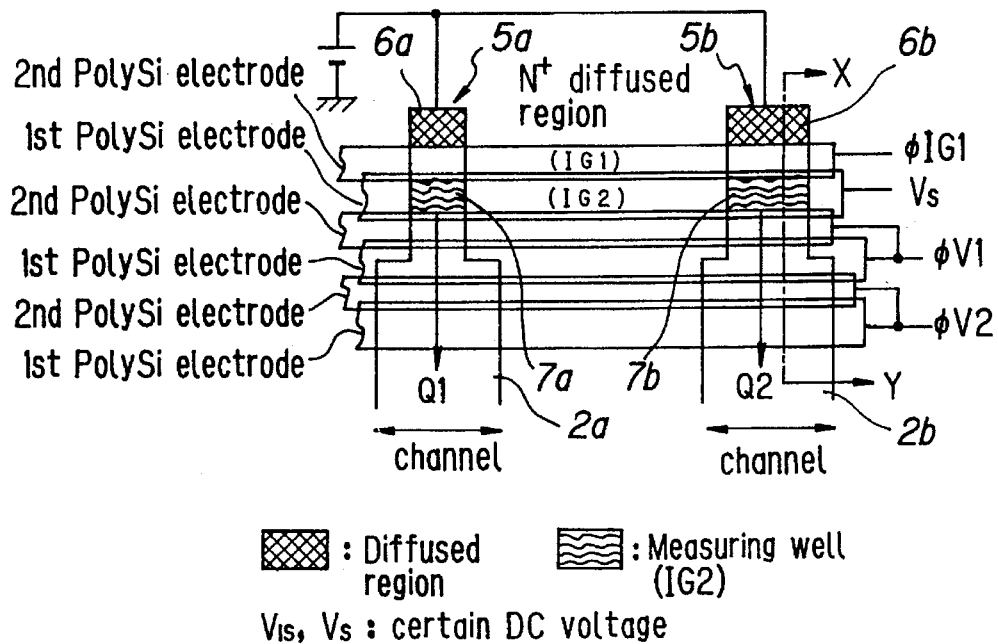
Figure 3D:
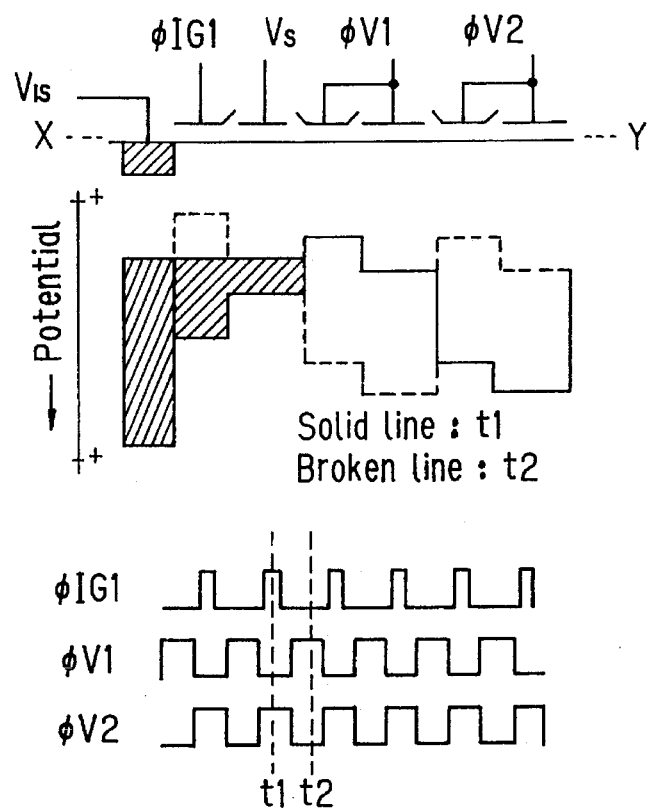
Figure 4A:
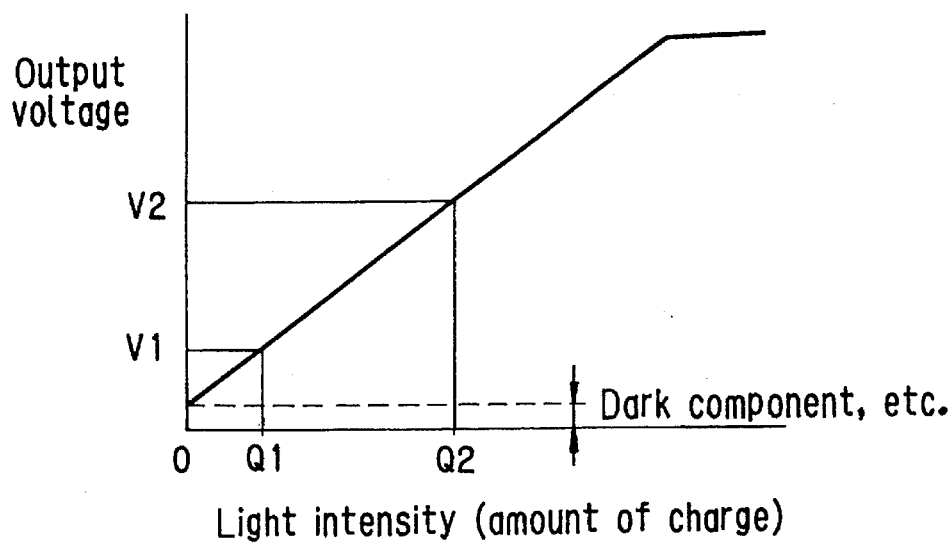
FIGS. 4A and 4B graphically show the charge-output voltage characteristic of the first embodiment in a standard state 4A and also in a state where a condition has changed 4B.
Figure 4B:
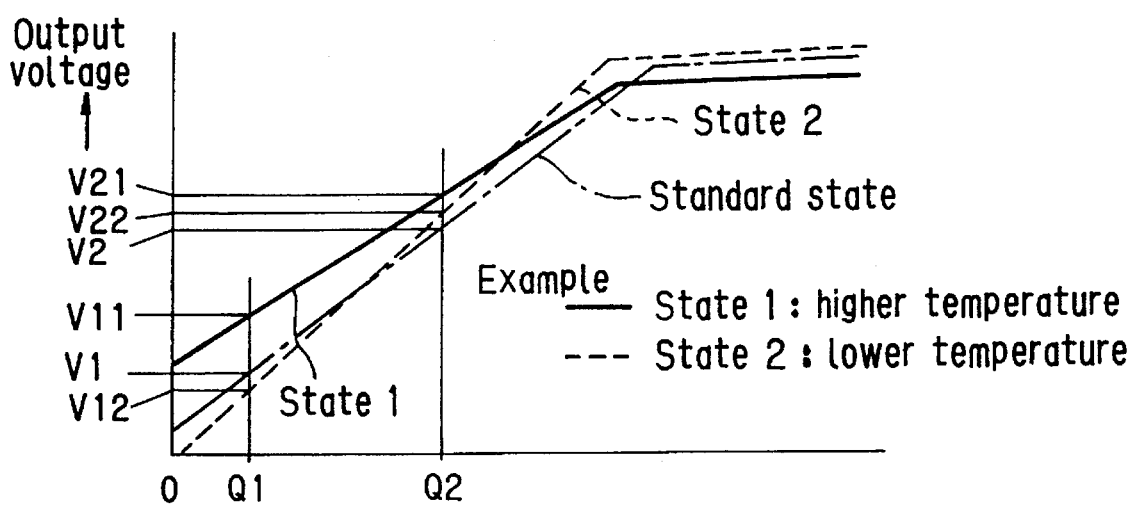

FIGS. 4A and 4B graphically show the charge-output voltage characteristic of the charge transfer device shown in FIGS. 3A to 3D. In the FIGS. 4A and 4B show the charge-output voltage characteristic of the charge transfer device in a standard state, and 4B shows the charge-output voltage characteristic in a state where the temperature is higher or lower than that in the standard state.

Assuming that an output voltage obtained by conversion of the reference charge Q1 in the standard state is V1 and an output voltage obtained by conversion of the reference charge Q2 in the standard state is V2, when the temperature becomes higher than that in the standard state, the output voltage V1 rises to V11, and the output voltage V2 also rises to V21.

Conversely, when the temperature becomes lower than that in the standard state, the output voltage V1 lowers to V12, while the output voltage V2 rises to V22.

Accordingly, it is possible to judge the charge-output voltage characteristic from the present levels of the output voltages V1 and V2 resulting from the reference charges Q1 and Q2. More specifically, it is possible to detect a slope of a curve representative of the charge-output voltage characteristic and also an output voltage at a point where the charge-output voltage characteristic curve intersects the ordinate axis where the light intensity is 0, i.e., a dark component. It should be noted that Q1 and Q2 must be selected within a range where the characteristics have linearity.

Accordingly, by controlling the gain of AGC (Automatic Gain Control) in the signal system on the basis of the detected charge-output voltage characteristic, it is possible to compensate for a variation of the output voltage $V_{out}$ caused by a change in the temperature or the supply voltage in the charge transfer device. The compensation may be made, for example, by multiplying the output voltage by (V2−V1)/(V21−V11) and subtracting the dark component from the resulting product.

Figure 5:
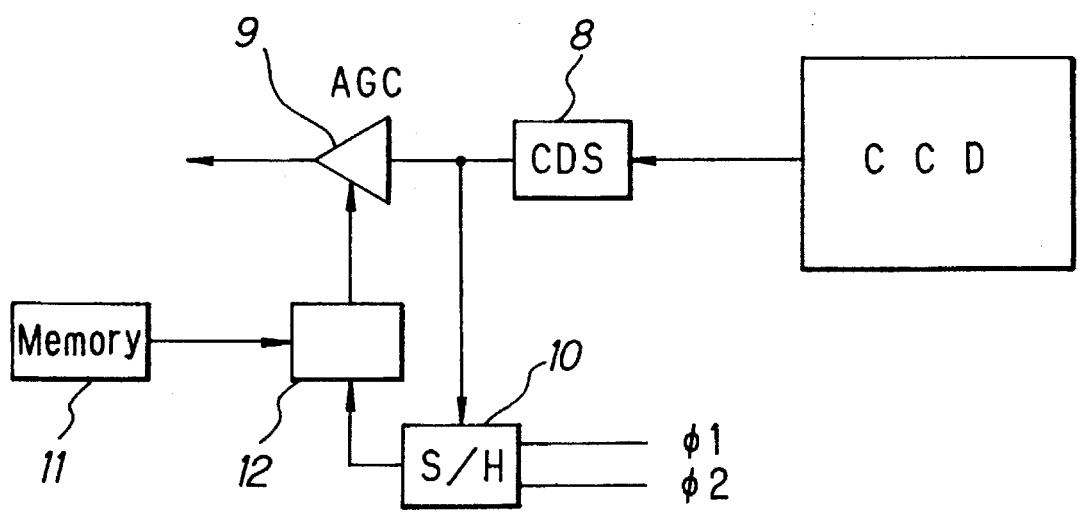
FIG. 5 is a circuit diagram showing one example of a circuit for compensating for a variation of the charge output voltage characteristic.

FIG. 5 is a circuit diagram showing one example of a circuit for compensating for a variation of the charge-output voltage characteristic.

Referring to the figure, a circuit 8, e.g., a CDS (Corrected Double Sampling) circuit, processes the output voltage $V_{out}$ from the charge transfer device (CCD type), and an AGC (Automatic Gain Control) type amplifier 9 amplifies a signal outputted from the circuit 8.

A sample-and-hold circuit 10 samples the output voltages V1 and V2 resulting from the reference charges in response to sample control pulses ø1 and ø2. A memory 11 stores the respective values of the output voltages V1 and V2 in the standard state. An arithmetic circuit 12 makes a comparison between the values of the output voltages V1 and V2 in the standard state, stored in the memory 11, and the present values of the output voltages V1 and V2, e.g., V11 or V12 and V21 or V22, and calculates a proper value as a gain for the AGC type amplifier 9 on the basis of the result of the comparison. The output of the arithmetic circuit 12 is inputted to a gain control terminal of the AGC type amplifier 9.

Thus, according to the charge transfer device of this embodiment, it is possible to prevent variation of the output voltage for the same signal charge which would otherwise be caused by a change in the temperature or the supply voltage.

Figure 6A:
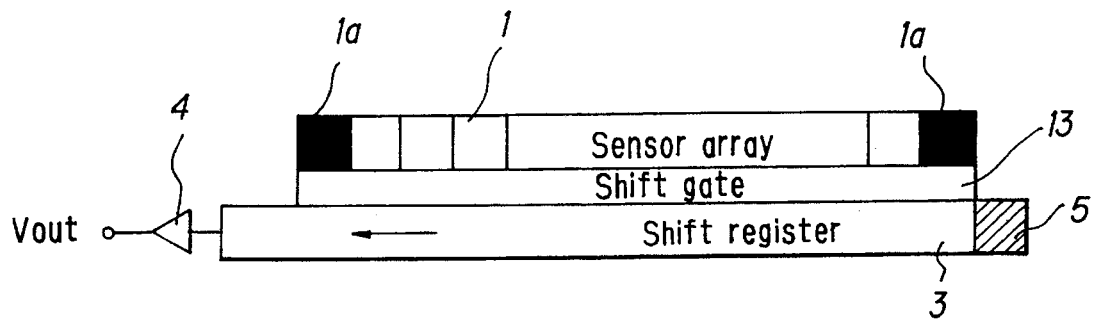
FIGS. 6A and 6B show a second embodiment of the charge transfer device according to the present invention, in which 6A is a plan view of the second embodiment, and 6B shows the waveforms of transfer and other control pulses and a voltage outputted from a voltage conversion portion.
Figure 6B:
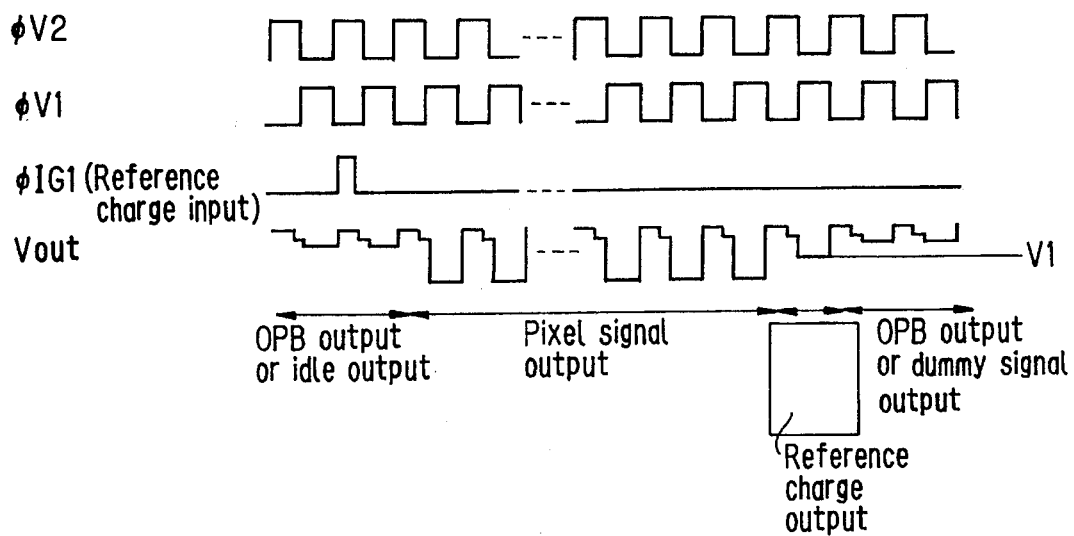

FIG. 6A and 6B show a second embodiment of the charge transfer device of the present invention, in which 6A is a plan view, and 6B is a waveform chart. In this embodiment, the charge transfer device of the present invention is applied to a linear sensor.

Photosensors 1 form a single sensor array in which photosensors 1a at both ends of the sensor array are shielded from light.

A shift gate 13 is provided on one side of the sensor array to extend parallel to it. A charge transfer portion (which may be considered equivalent to the horizontal register in FIG. 3A to 3D) 3 is provided on a side of the shift gate 13 which is remote from the sensor array, to extend parallel to the shift gate 13. Reference numeral 4 denotes a buffer.

A reference charge input portion 5 is provided at an end of the charge transfer portion 3 which is opposite to the output end thereof. Since the reference charge input portion 5 has an arrangement approximately the same as that of the reference charge input portion 5a or 5b, shown in FIG. 3C, illustration thereof in an enlarged plan view is omitted.

In the charge transfer device of this embodiment, pixel signal charges are simultaneously read parallel from the sensor array (1a and 1) to the horizontal register 3 through the shift gate 13. In addition, a reference charge is inputted from the reference charge input portion 5 to the bit of the horizontal register 3 that is the remotest from the output end. It should be noted that no pixel signal charge is inputted to this bit because the photosensor that corresponds to the relevant bit is the shielded photosensor 1a. Therefore, there is no possibility that a signal charge generated by photoelectric conversion will get mixed in the reference charge.

Accordingly, in the charge transfer device of this embodiment, the reference charge is outputted after the pixel signal charges have been outputted. It should be noted that the shielded photosensor 1a in the sensor array that is the closest to the output end contributes to outputting OPB (Optical Black). Accordingly, it is possible to detect a dark component.

The charge transfer device of this embodiment enables a charge-output voltage characteristic to be judged from the output voltage V1 of the buffer 4 that corresponds to the reference charge, together with the OPB output.

Figure 7:
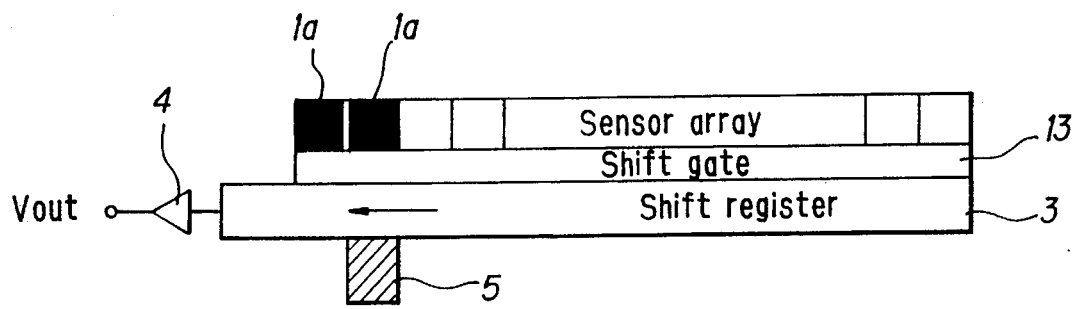
FIG. 7 is a plan view of a third embodiment of the charge transfer device according to the present invention.

FIG. 7 is a plan view of a third embodiment of the charge transfer device according to the present invention. This embodiment differs from the second embodiment in the way in which a reference charge is inputted to a bit of the shift register 3. In the third embodiment, a reference charge is inputted to an intermediate bit of the shift register 3 from a reference charge input portion 5. More specifically, a photosensor 1a that is the closest to the output end is shielded from light to contribute to detection of OPB, and a photosensor 1a next to the shielded photosensor 1a is also shielded from light. The reference charge input portion 5 is provided so that a reference charge is supplied to the 2-nd bit of the shift register 3 that corresponds to the 2-nd shielded photosensor 1a.

Accordingly, in this charge transfer device, an OPB output is first delivered from the buffer 4, and then a reference charge output is generated. Thereafter, an idle output and a pixel signal output are successively generated.

Figure 8:
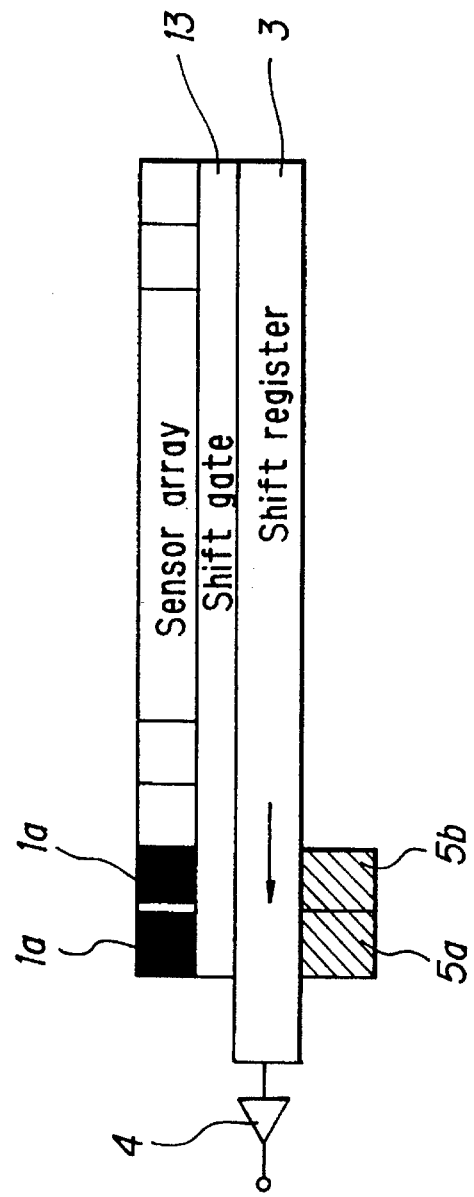
FIG. 8 is a plan view of a modification of the charge transfer device shown in FIG. 7.

FIG. 8 is a plan view of a modification of the charge transfer device shown in FIG. 7.

This charge transfer device is arranged to enable a charge-output voltage characteristic to be detected at two points in the same way as in the first embodiment. That is, two reference charges which are different in the amount of charge are inputted to different bits of the shift register 3 by two reference charge input portions 5a and 5b, respectively. With regard to the rest of the arrangement, the modification is the same as the third embodiment.

The charge transfer device of this modification allows a charge-output voltage characteristic to be accurately detected in the same way as in the first embodiment and hence enables even more perfect compensation for a variation of the charge-output voltage characteristic.

Figure 9:
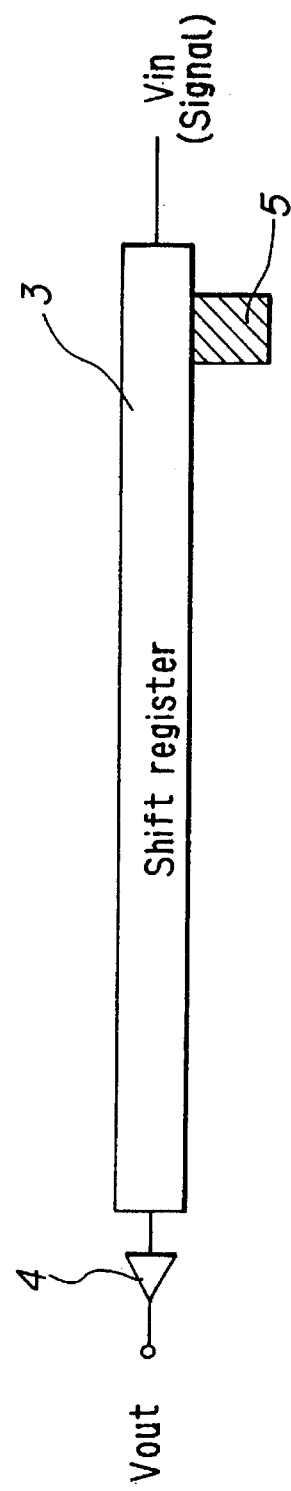
FIG. 9 is a plan view of a fourth embodiment of the charge transfer device according to the present invention.

FIG. 9 is a plan view of a fourth embodiment of the charge transfer device according to the present invention. In this embodiment, the charge transfer device of the present invention is applied not to a linear sensor or an area sensor (CCD type solid-stage image sensing device) but to a CCD type delay element. A reference charge is inputted to an intermediate bit of the shift register 3 in the same way as in the third embodiment.

Thus, the present invention can be applied not only to linear and area sensors but also to a CCD type delay element.

Figure 10A:
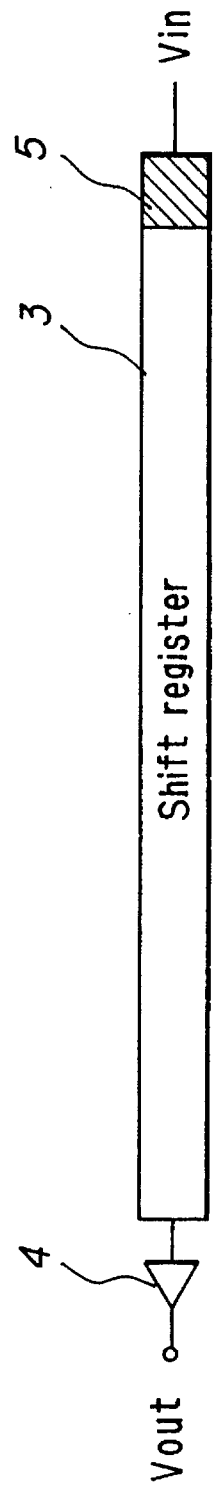
FIGS. 10A to 10C show a fifth embodiment of the charge transfer device according to the present invention, in which 10A is a plan view of the fifth embodiment, 10B is an enlarged plan view of a reference charge input portion, and 10C shows the waveforms of an input voltage, transfer and other control pulses and an output voltage.
Figure 10B:
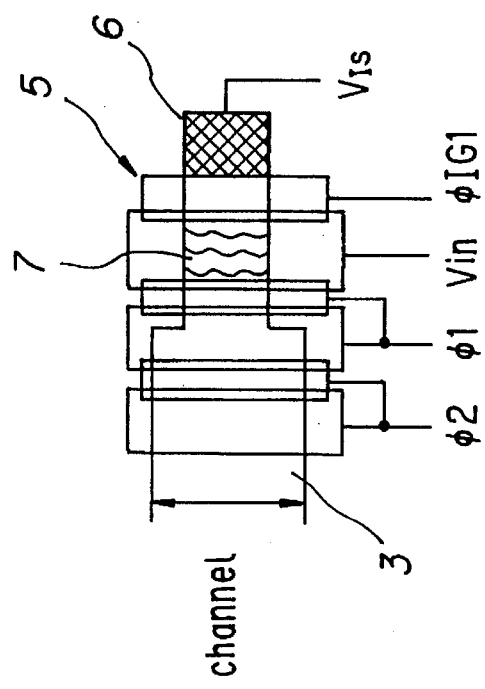
Figure 10C:
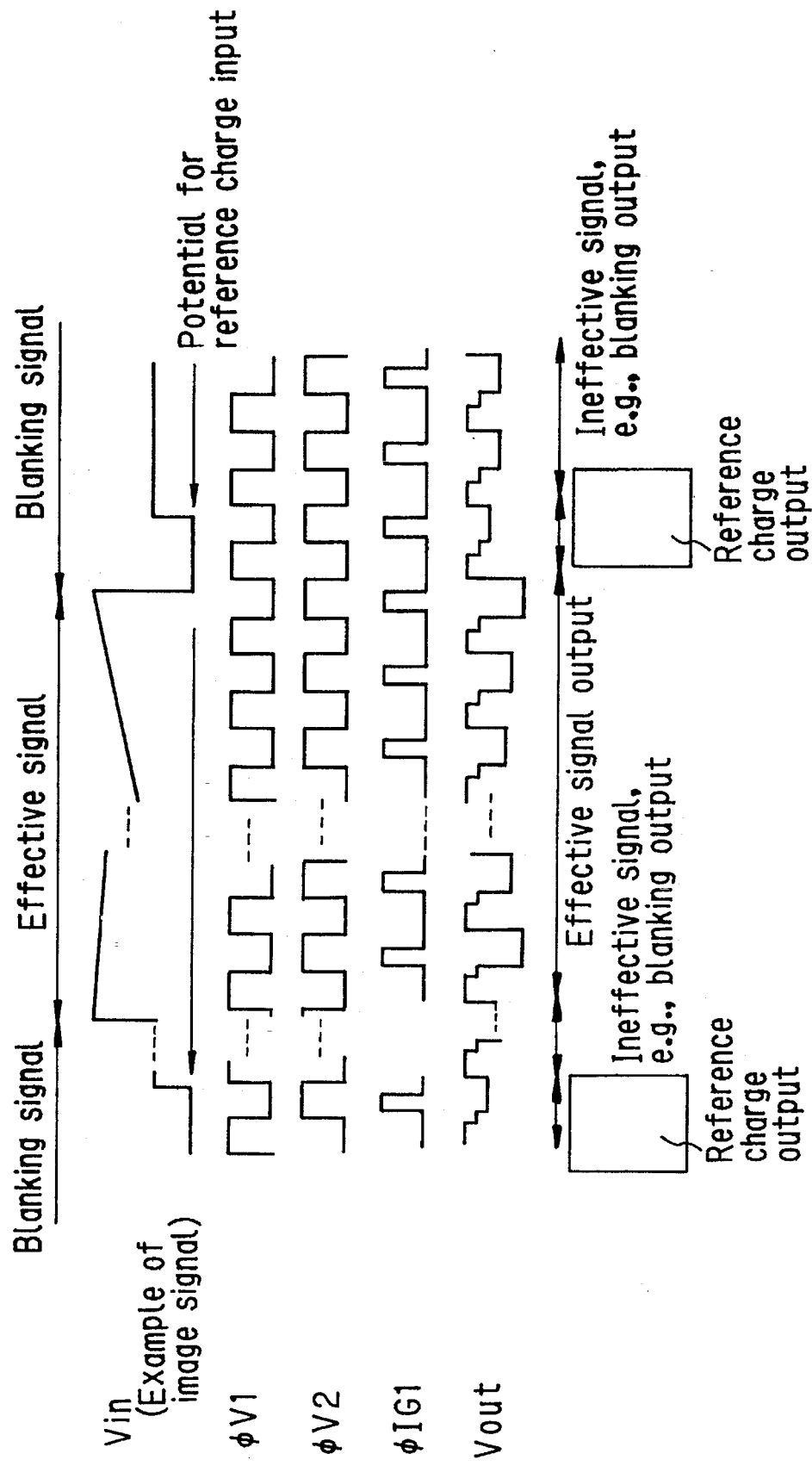

FIGS. 10A to 10C show a fifth embodiment of the charge transfer device according to the present invention, in which 10A is a plan view, 10B is a plan view of a reference charge input portion (also serving as a signal input portion), and 10C shows the waveforms of an input signal, transfer and other pulse output signals. In this embodiment also, the charge transfer device of the present invention is applied to a CCD delay element in the same way as in the fourth embodiment. This embodiment differs from the fourth embodiment in that a reference charge is inputted to a bit at the input end of the shift register 3. Reference numeral 6 denotes a diffused region for supply of a reference charge.

Thus, when the charge transfer device of the present invention is applied to a CCD delay element, it is necessary to arrange the system so that a reference charge is outputted not during the effective signal output period but during the blanking period, as shown in FIG. 10C.

Figure 11:
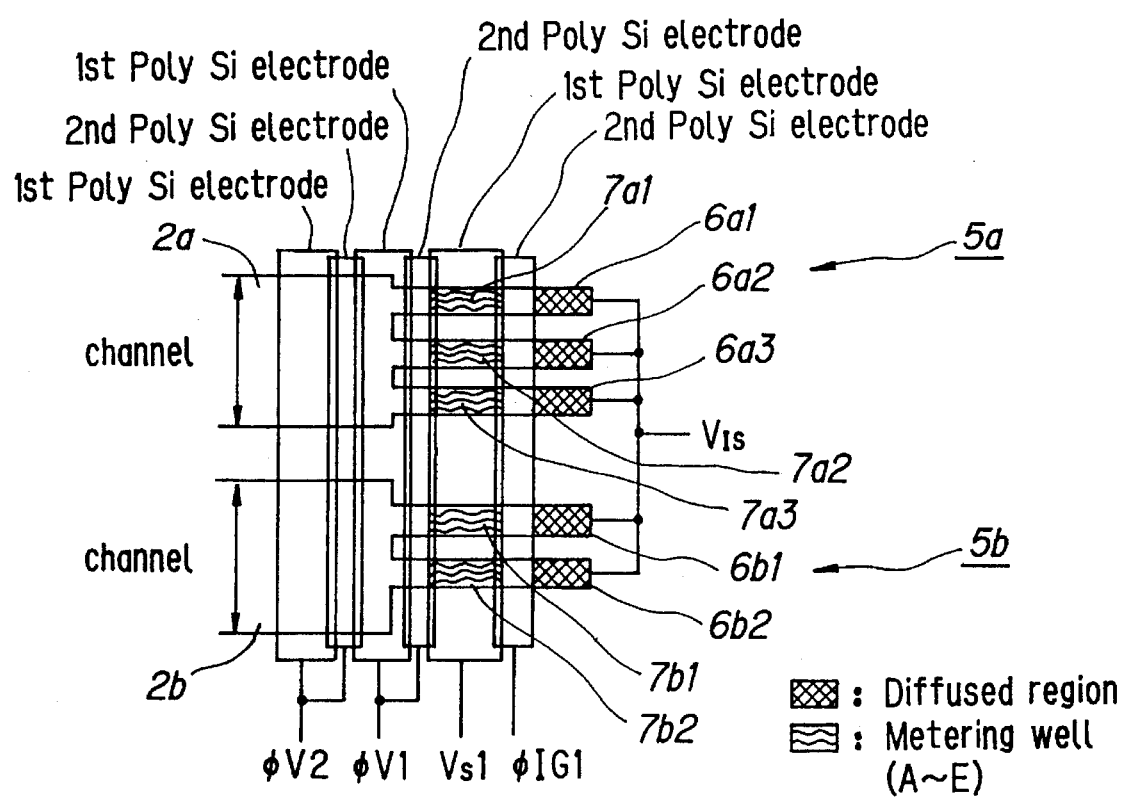
FIG. 11 is a plan view showing charge transfer and input portions constituting an essential part of a sixth embodiment of the charge transfer device according to the present invention.

It should be noted that the detection of a charge-output voltage characteristic by the charge transfer device of the present invention can be effected either by a method based on a single reference charge having a predetermined amount of charge or by a method in which a charge-output voltage characteristic is detected at a plurality of points on the basis of a plurality of reference charges Q1 and Q2 having different amounts of charge (as in the first embodiment). The latter method, in which detection is carried out at a plurality of points, enables even more accurate detection of a charge-output voltage characteristic, that is, makes it possible to detect both a slope of a charge-output voltage characteristic curve and a dark component. With a view to effectively carrying out the detection method, it is preferable that the amounts of charge inputted to form two reference charges should be determined as accurately as possible. It is particularly important that the current ratio between two reference charges inputted should be determined as accurately as possible. FIG. 11 is a plan view showing an essential part of a sixth embodiment of the charge transfer device according to the present invention, which enables the ratio between the amounts of reference charge inputted from two reference charge input portions to be determined with extremely high accuracy.

The charge transfer device of this embodiment is arranged so that the ratio between reference charges to be inputted to the reference charge transfer portions 2a and 2b is 3:2. The reference charge input portion 5a of the reference charge transfer portion 2a includes a reference charge supply diffused layer 6a and a measuring well portion 7a. The diffused layer 6a is comprised of three divided regions 6a1, 6a2 and 6a3, which are equal in both area and configuration. Similarly, the measuring well portion 7a is comprised of three divided regions 7a1, 7a2 and 7a3, which are equal in both area and configuration.

The reference charge input portion 5b of the reference charge transfer portion 2b includes a reference charge supply diffused layer 6b and a measuring well portion 7b. The diffused layer 6b is comprised of two divided regions 6b 1 and 6b2, which are equal in both area and configuration. Similarly, the measuring well portion 7b is comprised of two divided regions 7b1 and 7b2, which are equal in both area and configuration. The divided regions (e.g., 6a1 and 6b 1) in the diffused regions 6 of the reference charge input portions 5a and 5b are also equal in both area and configuration, and the divided regions (e.g., 7a1 and 7b1) in the measuring well portions 7 are also equal in both area and configuration.

Accordingly, the ratio between reference charges to be inputted to the registers 2a and 2b can be accurately made an integral ratio, i.e., 3:2, and hence the charge-output voltage characteristic can be accurately grasped.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A charge transfer device comprising:

a charge input means for inputting two different magnitude reference charges;

a plurality of photo cells shielded from light for creating a dark signal component for each reference charge;

a plurality of photo electric conversion elements for converting incident light into signal charges;

a charge transfer portion for receiving the reference charges and dark signal components, and signal charges, and transferring the reference charges and dark signal components together, and the signal charges, at different times; and a conversion portion converting the reference charges and dark signal components outputted from the charge transfer portion into two reference voltages and using said reference voltages for converting said signal charges into signal voltages.

2. A charge transfer device according to claim 1, wherein said reference charges are generated in said charge input means.

3. A charge transfer device comprising:

a plurality of photoelectric conversion elements;

a charge transfer portion for transferring signal charges generated in said photoelectric conversion elements;

a reference charge input means including two photoelectric conversion elements being shielded from light, for inputting two different reference charges including dark signal component to said charge transfer portion, said charge transfer portion transferring said two different reference charges with dark signal component and said signal charges at different times; and a conversion portion for converting each of said two different reference charges with said dark component and said signal charges outputted from said charge transfer portion into a respective voltage, said respective voltage converted from said signal charges modified by a coefficient determined mathematically by said respective voltages of said two different reference charges.

4. A charge transfer device according to claim 3, wherein said reference charge input means includes a plurality of charge input portions for generating reference charges, respectively.

5. A charge transfer device comprising:

a plurality of photoelectric conversion elements arranged in a matrix form;

a vertical charge transfer portion for vertically transferring signal charges generated in said photoelectric conversion elements; two reference charge input portions for inputting two reference charges to said vertical charge transfer portion, means for inputting two reference charge components from two optically shielded photoelectric conversion elements to said vertical charge transfer portion, said vertical charge transfer portion for vertically transferring said reference charges and said dark signal components;

a horizontal charge transfer portion for horizontally transferring the reference charges with dark signal components, and signal charges outputted from said vertical charge transfer portion at different times, said reference charges with dark signal components transferred during a blanking period; and a conversion portion for converting each of said reference charges with dark signal component and signal charges outputted from said horizontal charge transfer portion into a respective voltage, said respective voltage corresponding to said signal charges modified by a coefficient determined mathematically by said respective voltages of said two different reference charges.

6. A charge transfer device according to claim 5, wherein there are a plurality of said vertical charge transfer portions each having one of said charge input portions for inputting reference charges respectively.

7. A charge transfer device according to claim 6, wherein said reference charge input portions have respective measuring well portions for each determining an amount of reference charge, said measuring well portions having a specific area ratio.

8. A charge transfer device according to claim 6, wherein said reference charge input portions each have at least one measuring well portion having a predetermined area for determining an amount of reference charge, the respective numbers of measuring well portions of said reference charge input portions being set to have a specific ratio.

9. A charge transfer device according to claim 6, wherein said charge input portions each comprise a plurality of reference charge supply diffused layers and corresponding measuring well portions, said charge input portions having different pluralities of said reference charge supply diffused layers and corresponding measuring well portions.

10. A charge transfer device according to claim 5:

wherein said plurality of photoelectric conversion elements are arranged in rows and columns;

wherein said vertical change transfer portion comprises vertical registers associated with each columns of said photoelectric conversion elements for transferring charges from said photoelectric conversion elements in a vertical direction;

wherein said horizontal charge transfer portion comprises a horizontal register associated with said vertical registers for transferring charges from said vertical registers in a horizontal direction;

wherein said two reference charge input portions comprise a first reference charge input means for inputting a first reference charge into a first vertical register of said vertical registers;

and a second reference charge input means for inputting a second reference charges whose magnitude is different from that of said first reference charges into a second vertical register of said vertical registers;

and all of the photoelectric conversion elements which are associated with said first and second vertical registers being shielded from light; and said conversion portion converting the first and second reference charges generated in said first and second reference charge input means and signal charges generated in said photoelectric conversion elements into two reference voltages and signal voltages respectively.

11. A charge transfer device according to claim 10 wherein said first vertical register is adjacent to said second vertical register.

12. A charge transfer device according to claim 11 wherein said two reference voltages are outputted from said conversion portion continuously within said blanking period.

* * * * *